US008584045B2

(12) United States Patent
Rode et al.

(10) Patent No.: US 8,584,045 B2
(45) Date of Patent: Nov. 12, 2013

(54) SYSTEMS AND METHODS FOR NAVIGATING, FINDING, AND PRESENTING DATA OBJECTS

(75) Inventors: Jochen Rode, Dresden (DE); Patrick Boettcher, Edingen-Neckarhausen (DE)

(73) Assignee: SAP AG, Walldorf (DE)

( * ) Notice: Subject to any disclaimer, the term of this patent is extended or adjusted under 35 U.S.C. 154(b) by 968 days.

(21) Appl. No.: 11/625,056

(22) Filed: Jan. 19, 2007

(65) Prior Publication Data
US 2008/0178101 A1 Jul. 24, 2008

(51) Int. Cl.
*G06F 3/048* (2013.01)
*G06F 7/00* (2006.01)
*G06F 17/30* (2006.01)

(52) U.S. Cl.
USPC ........... 715/854; 707/708; 707/709; 707/769; 715/764

(58) Field of Classification Search
USPC .......... 707/769, 797, 798, 708, 709; 715/764, 715/854, 784
See application file for complete search history.

(56) References Cited

U.S. PATENT DOCUMENTS

| 6,144,385 | A | * | 11/2000 | Girard | 345/424 |
| 6,847,979 | B2 | | 1/2005 | Allemang et al. | |
| 6,947,928 | B2 | * | 9/2005 | Dettinger et al. | 1/1 |
| 7,089,266 | B2 | | 8/2006 | Stolte et al. | |
| 7,111,253 | B2 | | 9/2006 | Newman | |
| 7,219,307 | B2 | * | 5/2007 | Senay | 715/764 |

* cited by examiner

*Primary Examiner* — Boris Pesin
*Assistant Examiner* — Elizabeth G Wright
(74) *Attorney, Agent, or Firm* — Fish & Richardson P.C.

(57) ABSTRACT

Various systems and related methods involve navigating, finding, and visually presenting data objects or sets of data objects. In one implementation, a set of data objects is visually presented as a graphical element and one or more semantic relationships between the graphical element and other sets of data objects are visually presented. Furthermore, this includes a method for finding related sets of data objects by presenting different search paths and enabling the user to select a destination set of data objects based on the presented paths. One possible operation associated with this system includes presenting relationships between data objects outside of predefined work flows.

20 Claims, 8 Drawing Sheets

SYSTEMS AND METHODS FOR NAVIGATING, FINDING, AND PRESENTING DATA OBJECTS

TECHNICAL FIELD

The description relates to navigating, finding, and visually presenting data objects to a user of a computer system.

BACKGROUND

Enterprises, such as businesses, often make use of information systems in their operations, such as enterprise resource planning (ERP) systems, customer relationship management (CRM) systems, and supply chain management (SCM) systems. Such information systems typically manage large amounts of data about customers, suppliers, purchase orders, sales orders, production orders, material, and the like. ERP systems generally include predefined work flows, which may be visually presented to users of the system. ERP systems often make use of individual data objects in such visual presentations and in related operations. Such data objects may include any of the hundreds of business objects which may be useful in one or more applications, business environments, industries, and the like.

SUMMARY

One method of visually presenting information to a computer user involves presenting multiple graphical elements to such user. One of the graphical elements corresponds to a set of data objects. A semantic relationship between the graphical element corresponding to the set of data objects and another graphical element is also presented.

In one variation, a business object is also presented in graphical form, and the multiple graphical elements which are presented are related to such business object. Furthermore, multiple semantic relationships between the business object and the set of data objects are presented.

One possible operation involves responding to a user's selection of a graphical element by presenting a second graphical element. The second graphical element may correspond to a second set of data objects, this set of data objects being of a different type than the first set of data objects presented. Another semantic relationship between the second set and the first set is also presented.

Still another method involves presenting multiple graphical elements in response to user input related to a destination data object or a set of destination data objects. The presentation may include multiple paths to the destination objects, the paths including multiple graphical elements and at least one semantic relationship between the graphical elements of the respective paths.

A computer program product includes instructions to perform operations involving determining semantically related data objects from an initial data object or initial set of data objects. Data objects having the same type and the same type of semantic relationships are grouped into a set. Information associated with either a particular data object, sets of data objects, and/or relationships is determined.

According to one implementation, an information system includes suitable hardware, software, or a combination of hardware and software for performing a variety of functions. The system receives user input related to a business object. Data objects of the same type are associated into a corresponding set, and a determination is made of which sets of data objects are semantically related to the business object. A visual representation of which sets of data objects are related to the business object is made, including at least one semantic relationship between the sets of data objects and the business object. The system allows for altering the visual representation to present a modified visual representation, such as in response to user selection of one of the sets of data objects presented. The information system may include an enterprise resource planning system, a customer relationship management system, and a supply chain management system.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
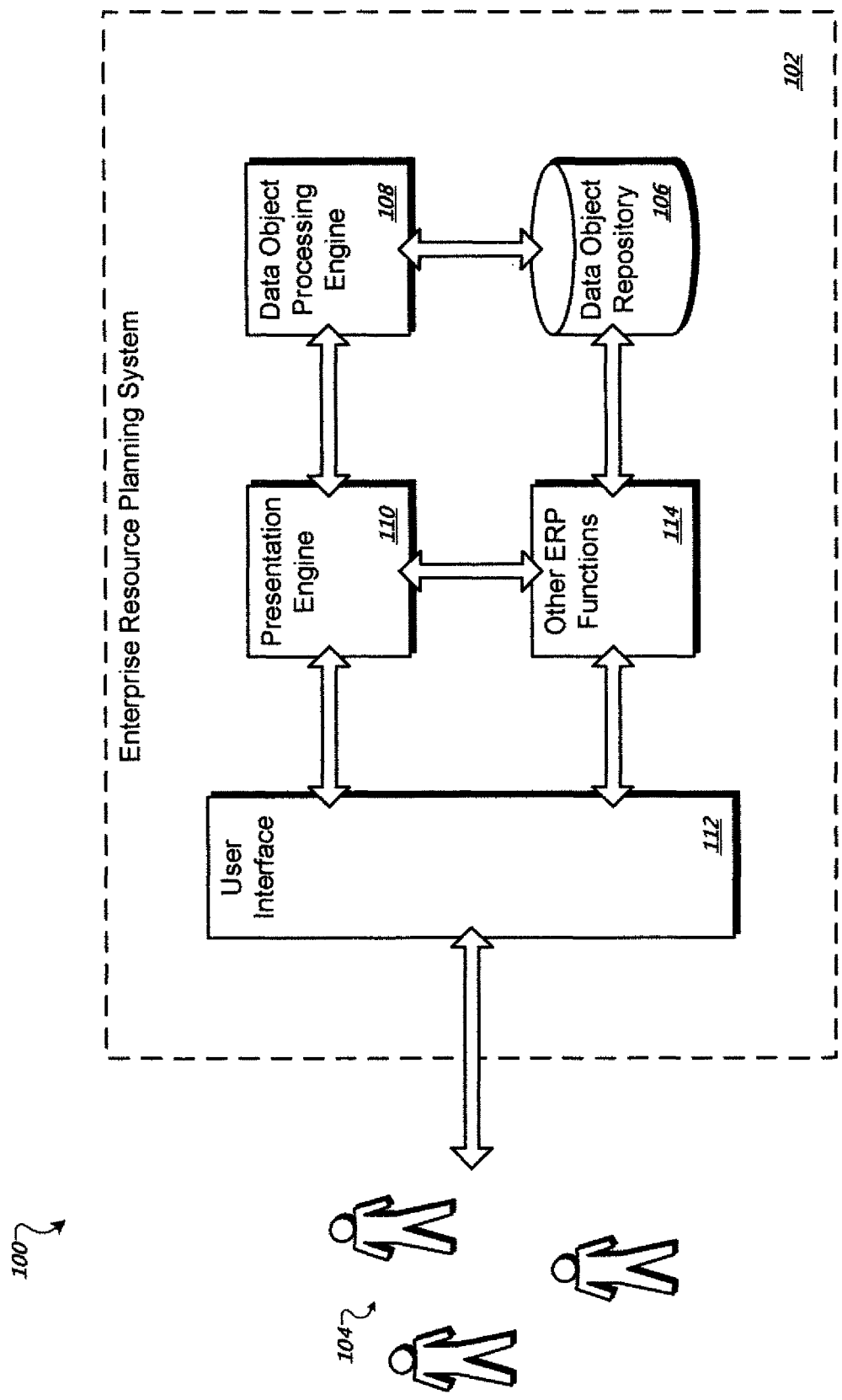
FIG. 1 is a block diagram showing an example of a system for presenting sets of data objects and semantic relationships between the sets of data objects.

FIG. 1 is a block diagram showing an example of an information system 100 for presenting data objects or sets of data objects, along with semantic relationships between the data objects or sets of data objects. It will be appreciated that information system 100 may be any system that represents data in typed data objects and is not limited to enterprise management or business-related systems. Thus, for purposes of illustration and not limitation, one possible implementation of system 100 includes an enterprise resource planning (ERP) system 102 and one or more users 104 of the ERP system 102. The ERP system 102 is any of a variety of ERP systems which manage large amounts of heterogeneous data objects about customers, suppliers, purchase orders, sales orders, production orders, material, and the like. As just one of many alternatives, other suitable systems may be used to present sets of data objects (e.g., a library catalog including data objects such as books, authors, papers, publishers, and other literary information). In general, the ERP system 102 may be any system that manages relatively large amounts of data objects where the data objects are related in various ways.

In particular, the ERP system 102 presents a variety of graphical elements to the users 104 including graphical elements that represent data objects and sets of data objects. Each of such graphical elements represents a data object or set of data objects having a particular type. The types may be many and varied, depending on the application or any number of factors, but may include types such as customer, supplier, purchase order, material, and so on. In addition, the ERP system 102 presents various semantic relationships between certain graphical elements, including those corresponding to sets of data objects, such semantic relationships include "contains," "is used by," "executes," or "is handled by."

The ERP system 102 includes a data object repository 106, a data object processing engine 108, a presentation engine 110, and a user interface 112. The data object repository 106 stores information about the data objects and the relationships between the data objects. The data object repository 106 may be, for example, one or more relational database management systems.

Starting from one particular data object (or set of data objects) contained in the data object repository 106, the data object processing engine 108 determines all semantic relationships to other data objects. All data objects that have the same type and are related to the initial data object (or set of data object) in the same way (i.e. the semantic relationship is of the same type), are grouped into a set of data objects. The data object processing engine 108 may be, for example, a software application executed by a processor in a computing device.

The presentation engine 110 receives suitable data from the data object processing engine 108, including sets of data objects and their relationships. The presentation engine 110 generates a visual representation of the sets of data objects and their relationships. In this implementation, the presentation engine 110 represents each set of data objects as a graphical element and represents the semantic relationships between the graphical elements. The presentation engine 110 may be, for example, a software application executed by a processor in a computing device.

The presentation engine 110 outputs the generated graphical elements and their relationships to the users 104 through the user interface 112. For example, the user interface 112 may include a display device to present the graphical representations and their relationships. The user interface 112 may also include input devices, such as a pointing device and/or a keyboard. The users 104 may make inputs using the user interface 112 to request an alteration or modification of the presented graphical elements and their relationships. For example, the users 104 may perform a variety of research or input queries related to one or more data objects. The ERP system 102 may present, in response, a variety of ad hoc visualizations, including sets of data objects for special cases or scenarios and flows which are otherwise outside predefined workflows of the ERP system 102.

The ERP system 102 also includes one or more modules 114 that perform other ERP functions, such as human resources processing, accounting processing, and supply chain management processing. For example, the module 114 may monitor the status of a vehicle, such as a truck, used to transport a delivery. The delivery may include one or more materials and the materials may be used by one or more production orders. The relationships between the data objects (e.g., the vehicle resource, the delivery, the materials, and the production orders) may be presented to the users 104 in the form of a browseable semantic network of data objects. The module 114 may notify the users 104, for example in an e-mail message, when the status of the truck transporting the delivery has changed to "broken down." The notification may include a link to a visual representation of sets of data objects related to the delivery and their semantic relationships.

Figure 2:
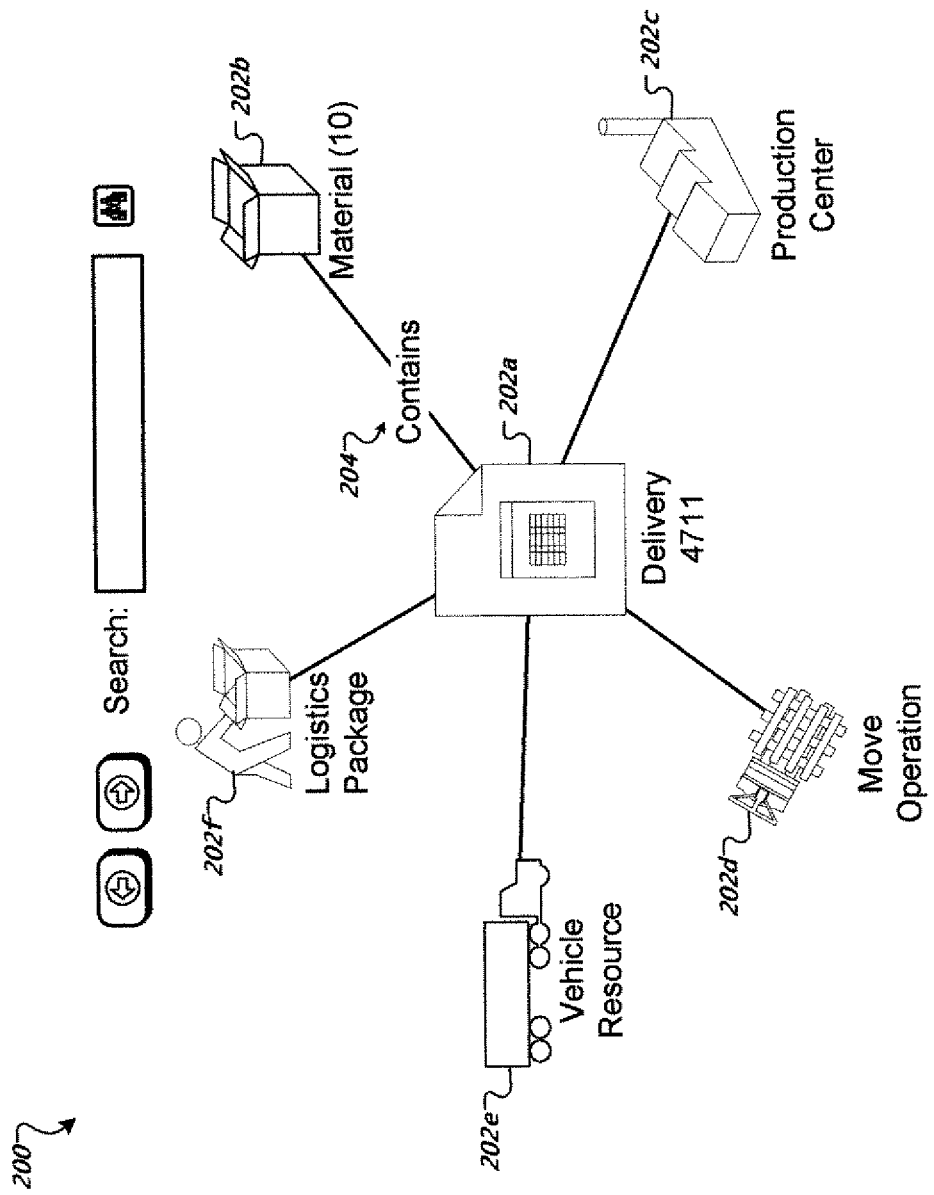
FIG. 2 is an example of a screen shot from a graphical user interface for presenting sets of data objects and semantic relationships between the sets of data objects.

FIG. 2 is one example of a screen shot of a graphical user interface (GUJI) 200 for presenting data objects or sets of data objects and semantic relationships between them as corresponding graphical elements. For example, the GUI 200 presents a graphical element 202a representing a delivery data object and graphical elements 202b-f representing other data objects or sets of data objects related to the delivery 202a. More particularly, the delivery data object corresponding to element 202a is related to the materials data object corresponding to element 202b. Element 202b includes an identifier "10" related to materials, which indicates that element 202b represents a set of 10 data objects of the material type related to the delivery 202a. The materials 202b are related to the delivery 202a by a "contains" relationship shown by graphical element 204, that is, the delivery 202a contains the materials 202b. The elements 202c-f are also related to the delivery 202a by semantic relationships. In this example, the delivery 202a is a business object in, for example, the ERP system 102. In one possible implementation, the GUI 200 is started as a pop-up window in response to a user clicking on a link on a screen or item in an information system such as an ERP system. For example, an ERP system may monitor the status of material deliveries and display an alert about a late delivery on screen. If the user clicks on the presented delivery the GUI 200 may be brought up to allow the user further analysis and action, not predefined in existing workflows.

In certain implementations, a particular type or instance of a data object may be presented individually rather than as a set of data objects. In certain implementations, a filter may be applied based on a particular type or instance of a data object. For example, the filter may specify one or more data object types and/or data object instances for inclusion or exclusion in the GUI 200. In certain implementations, the filter may be role-based, such that a user having a particular role is presented only with graphical elements and semantic relationships relevant and/or permitted for interaction by the user. In certain implementations, a number of data object relationship levels other than the single level shown in the GUI 200 may be used, such as two or more levels of data objects related to the delivery 202a (e.g., the sets of data objects related to the delivery 202a and the sets of data objects related to the materials 202b). In certain implementations, a user may select the number of data object relationship levels to be presented in the GUT 200. In certain implementations, a user may select individual elements to present in the GUI 200. For example, the user may select the elements 202a-c and then change the number of levels presented to two instead of one.

A user may make an input to request that additional information associated with an element be presented. For example, the user may initiate a menu of actions related to an element by right-clicking on the element. The user may select an option in the menu, such as "Show Details," to be directed to a user interface that presents detailed information regarding the element. Detailed information for the delivery 202b may include, for example, the expected arrival date. In addition, the menu may include an action to list the contents of the set of data objects represented by the element. For example, a user may request that a list of the 10 data objects in the materials 202b be presented. The users 104 may then choose to sub-select one or more of the data objects for further navigation or analysis.

Further navigation and related processes may be instituted when a user clicks on an icon representing a particular data object (or set of data objects). In response, the GUI 200 would be altered to show this data object in the center of the screen. This change in the GUT 200 may be represented as an animation. The icon representing the data object that the user has clicked on may move into the center of the screen and become larger. The icon that was previously in the center of the screen would move to the periphery. All other icons would move accordingly or disappear entirely (if they do not have a relationship to the new data object which is in focus). The animation may allow the user to follow the elements 202a-f as they progress to their new locations. Other variations in navigation, finding, and presenting data objects or sets of data objects, as well as the corresponding graphical elements and semantic relationships, are possible, both in response to user input or otherwise.

For example, the user may select the element 202b for materials to request an altered presentation of GUI 200 that includes the Materials graphical element 202b (representing a set of material data objects) in the center of the screen and the sets of data objects related thereto in the periphery.

Figure 3:
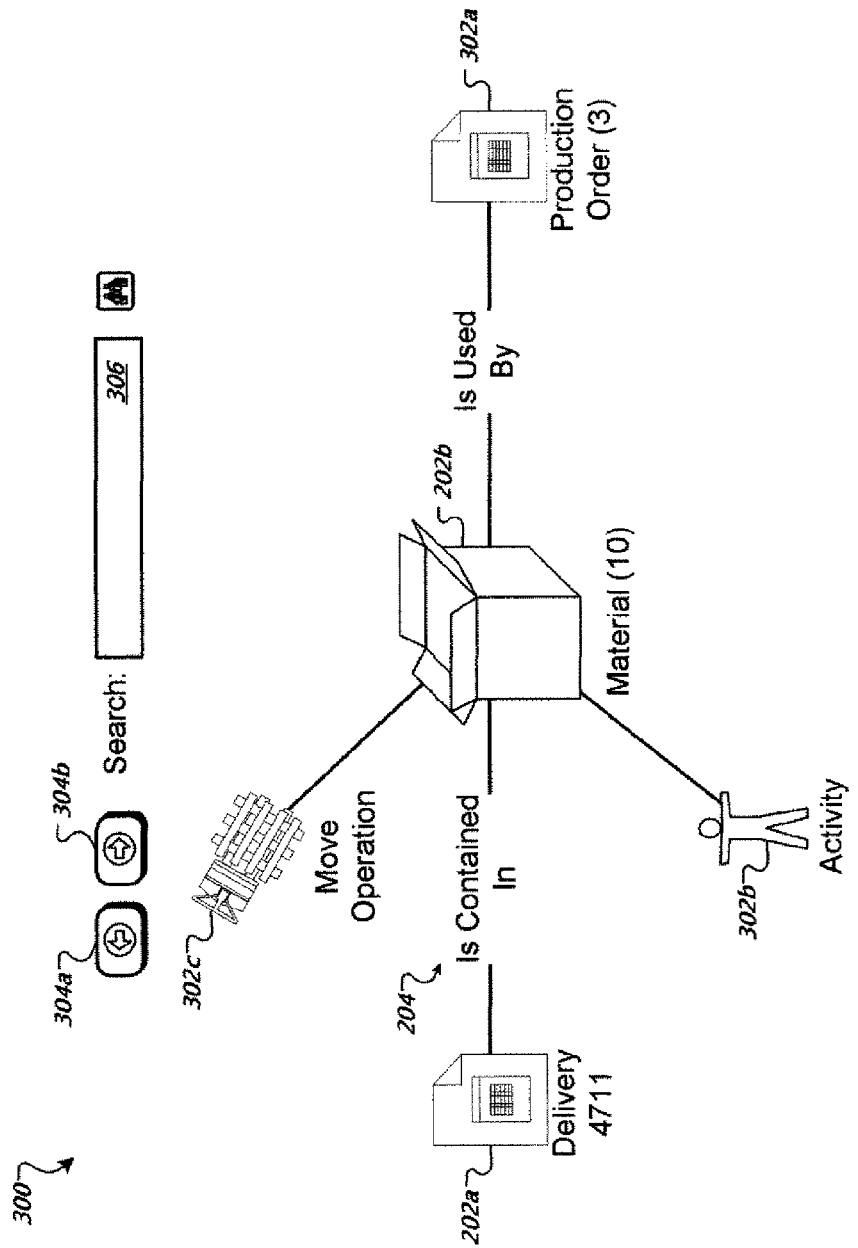
FIG. 3 is another example of a screen shot from a graphical user interface for presenting sets of data objects and semantic relationships between the sets of data objects.

FIG. 3 is an example of a screen shot of a graphical user interface 300 for presenting sets of data objects and semantic relationships between the sets of data objects. More particularly, the screen shot of GUT 300 show in FIG. 3 shows one possible presentation of data objects after element 202b has been selected as described above with reference to FIG. 2. The GUT 300 presents the graphical element 202b for materials more centrally, and graphical elements 302a-c, and 202a related to the materials element 202b are shown arranged around element 202b. The GUT 300 shows the semantic relationships between the element 202b "materials" and its related elements, such as the "contains" (or "is contained in") relationship 204 between the materials 202b and the delivery 202a. Other graphical elements such as Production Center 202c may disappear from the screen as they are not directly related to the new data object or set of data object in the center focus.

A user may move backward and forward through a history of visual representations by selecting controls 304a-b, respectively. For example, the user may select the control 304a to return to the screen shot of GUI 200 shown in FIG. 2. The control 304a may also offer a history function listing all the previously visited data objects (or sets of data objects). Still other variations, presentations, and navigations are possible.

In order to enable the finding of data objects, a user may make an input in field 306 to request a visual representation showing paths between an initial data object or set of data objects (such as that currently displayed in the center of the screen) and a destination object or set of data objects as entered in the search field 306. In this implementation, a suitable input requests a representation of the various paths between one point or data object, such as that represented by a certain one of the graphical elements, and the destination data object type indicated in the field 306.

Figure 4:
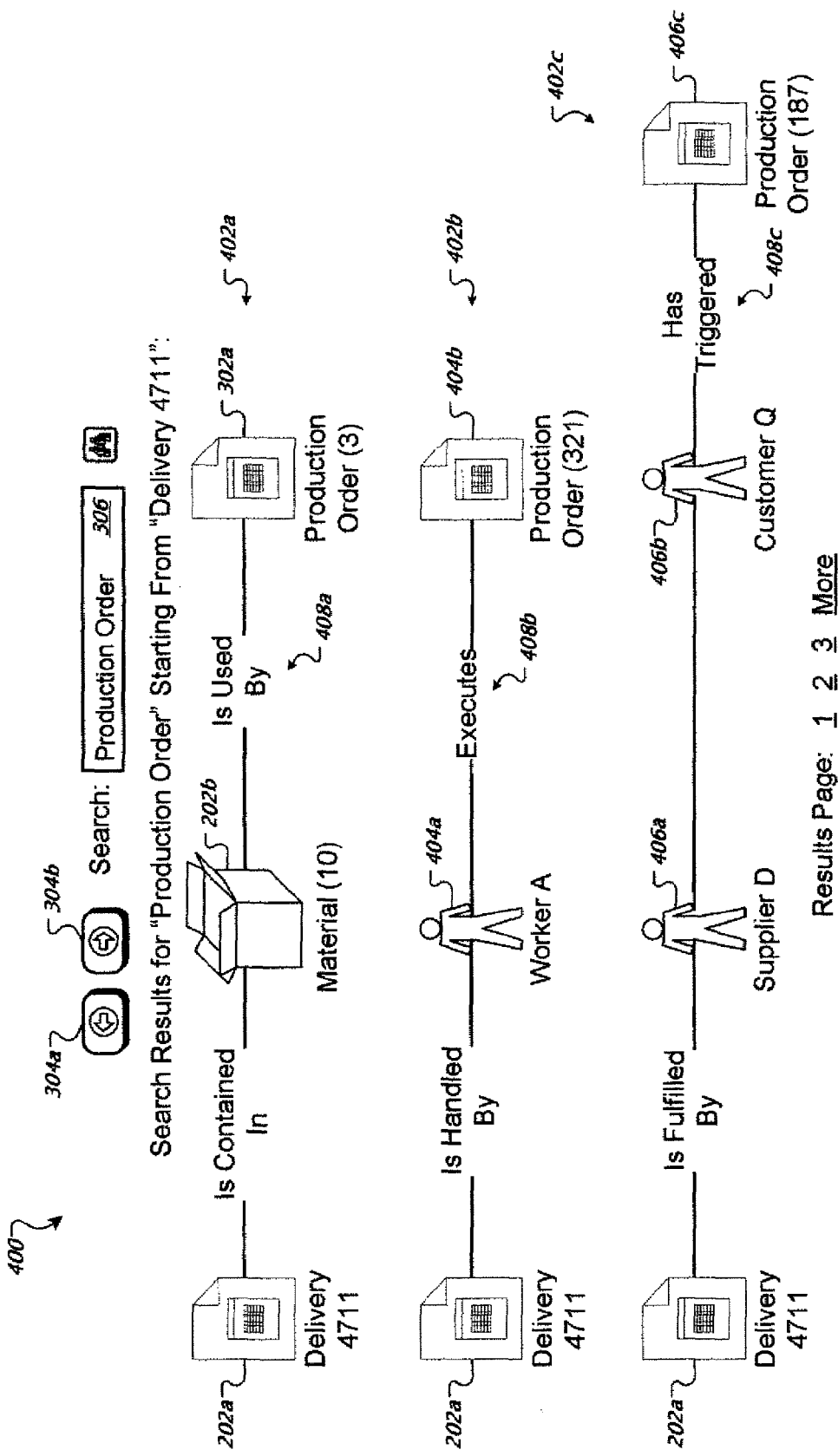
FIG. 4 is still another example of a screen shot from a graphical user interface for presenting various paths of semantic relationships between an initial data object (i.e. Delivery 4711) and a destination set of data objects (i.e. Production Order (n)).

The results of such operations may be represented as shown in FIG. 4. FIG. 4 is an example of a screen shot of a graphical user interface 400 for presenting various paths of semantic relationships between an initial set of data objects and a destination set of data objects. The GUI 400 presents graphical elements 402a-c corresponding to paths between the delivery element 202a and different sets of the production order data object type, as indicated in the field 306. Using shortened references to the graphical elements for simplicity, the path 402a traverses the delivery 202a, the materials 202b, and the production orders 302a. The path 402b traverses the delivery 202a, a worker 404a, and production orders 404b. The path 402c traverses the delivery 202a, a supplier 406a, a customer 406b, and production orders 406c. In this example, the production orders 302a, 404b, and 406c represent three different data object sets of the same data object type, each of the sets having varying relationships with other objects or sets of objects. For example, the materials 202b are related to the production orders 302a by an "Is Used By") relationship 408a, the worker 404a is related to the production orders 404b by an "Executes" relationship 408b, and the customer 406b is related to the production orders 406c by a "Has Triggered" relationship 408c. The GUI 400 may present, organize or order the paths 402a-c in any suitable manner, including arrangements not shown herein, or according to the number of levels between the source element 202a and the destination data object type from least to greatest. By looking at the different paths, the user can select the particular set of production order s/he is interested in. For example, if the user wanted to know which impact a late delivery has on a just-in-time production, s/he may be interested in the set 302a as it lists all the production orders that use any materials 202b contained in the delivery 202a.

A user may select one or more elements in the GUI 400 to request the presentation of information related to the selected element. For example, the user may select the delivery 202a to navigate to the GUT 200 or the materials 202b to navigate to the GUI 300. Alternatively, the user may request additional information as described with respect to FIG. 2 by selecting an item in a menu associated with the selected element.

Figure 5:
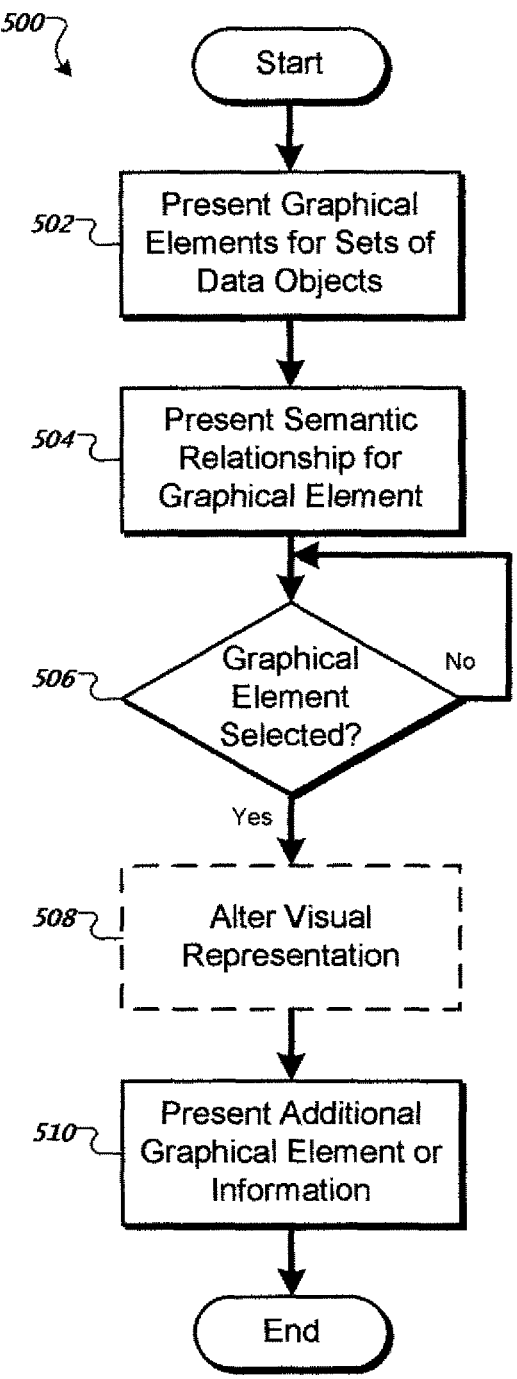
FIG. 5 is a flow chart showing an example of a process related to sets of data objects and semantic relationships between the sets of data objects.
Figure 6:
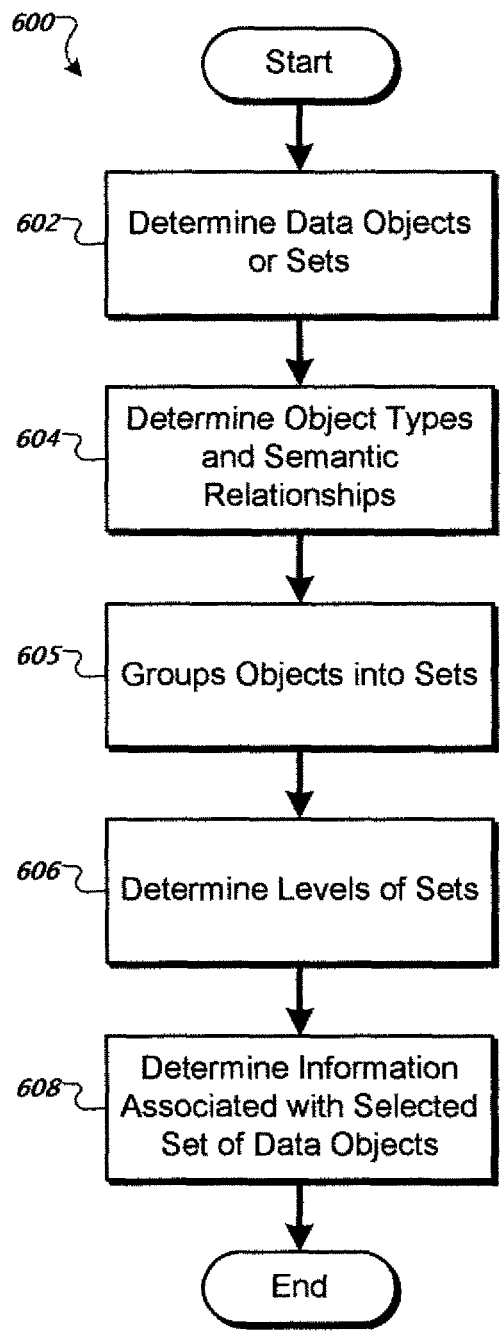
FIG. 6 is a flow chart showing an example of a process for processing sets of data objects and semantic relationships between the sets of data objects which may be implemented by suitable hardware, software, or a combination thereof.
Figure 7:
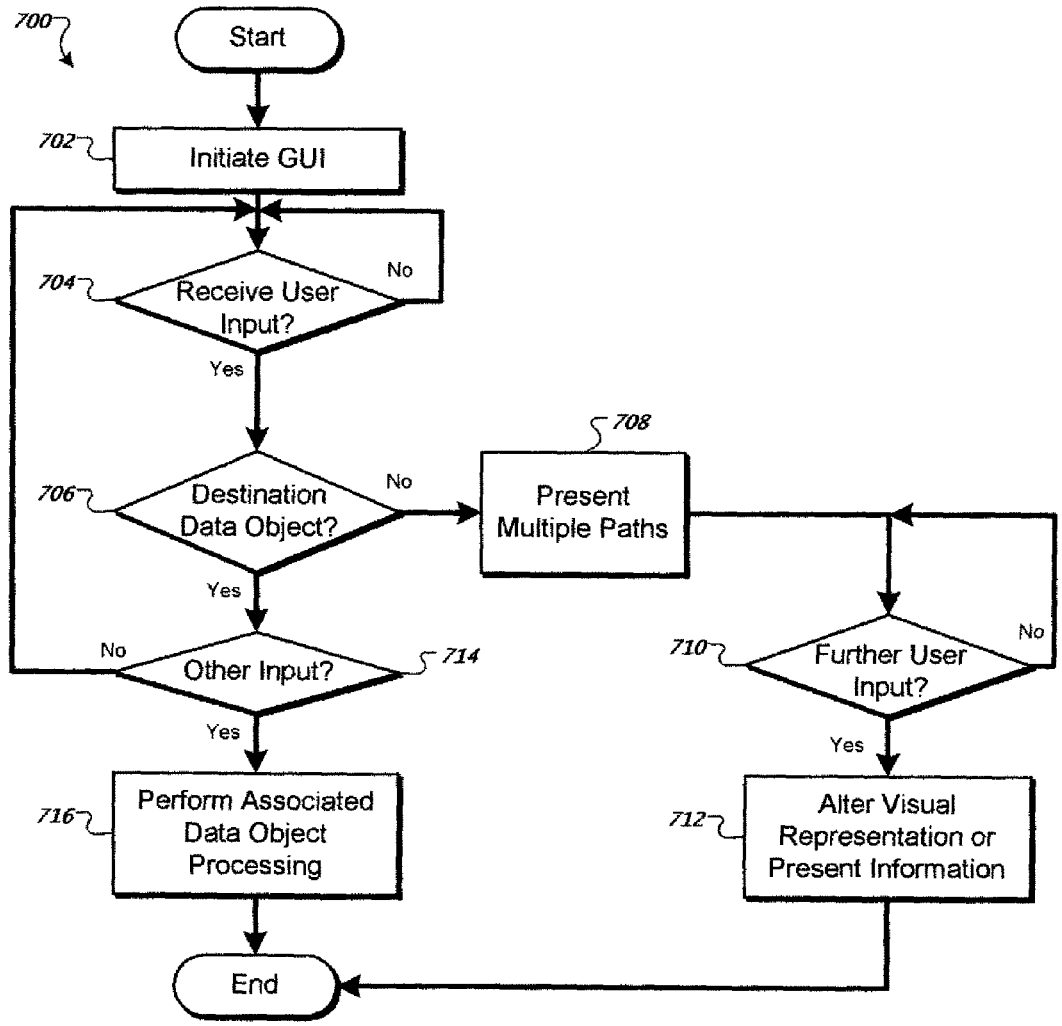
FIG. 7 is a flow chart showing an example of a process performed by an enterprise resource planning system to present sets of data objects and semantic relationships between the sets of data objects.

FIGS. 5, 6, and 7 are flow charts showing examples of processes 500, 600, and 700. The processes 500, 600, and 700 may be performed, for example, by a system such as the system 100. For clarity of presentation, the description that follows uses the system 100 and the GUIs 200, 300, and 400 as the basis of examples for describing the processes 500, 600, and 700. However, another system, or combination of systems, may be used to perform the processes 500, 600, and 700.

FIG. 5 is a flow chart showing an example of the process 500 for presenting sets of data objects and semantic relationships between the sets of data objects. The process 500 begins with presenting (502) graphical elements, including at least one graphical element that represents a data object or set of data objects. For example, the presentation engine 110 presents the elements 202a-f in the user interface 112.

The process 500 presents (504) one or more semantic relationships between the graphical elements. For example, the presentation engine 110 presents the relationship 204 between the delivery 202a and the materials 202b in the user interface 112.

If a graphical element is selected (506), then the process 500 optionally alters (508) the visual representation of the sets of data objects and their relationships. Otherwise, the process 500 waits for a graphical element to be selected. For example, within the GUI 200, the ERP system 102 may receive a user selection of the materials 202b directing the data object processing engine 108 to alter the graphical elements in the visual representation.

The process 500 presents (510) additional graphical elements or information. For example, the presentation engine 110 presents the GUI 300 including the graphical elements as determined by the data object processing engine 108 in response to the selection of the element 202b corresponding to materials. FIG. 6 is a flow chart showing an example of a process 600 related to processing sets of data objects and semantic relationships between the sets of data objects, which processing may be implemented by suitable hardware, software, or a combination thereof. The process 600 begins with determining (602) the data objects or sets of data objects directly related to the data object (or set of data objects) currently in focus in the center of the screen. The data object processing engine 108 may access the data object repository 106 in order to determine these data objects. If particular data objects are of the same type and are also related in the same way (604), these individual data objects may be grouped into one set of data objects (605). This avoids redundancy and visual overload for the users 104.

The process 600 may determine all data objects (or sets) which are directly related to the data object in focus or additionally determine more levels of data objects (606). For example, in the GUI 200 the process 600 may find that 10 materials 202b are contained in the delivery 202a and proceed to find all data objects that are related to one or more of these 10 materials and so on. The number of levels of semantic relationships which are traversed depends on the requirements for system performance and visual presentation. In the example shown in GUI 200, only one level of relationships are traversed and displayed to the user, reducing visual complexity.

The process 600 determines (608) information associated with a selected set of data objects. For example, in response to the selection of the materials 202b in the GUI 200, the data object processing engine 108 determines that the data objects represented by the elements 302a-c, and 202a are related to the materials 202b.

FIG. 7 is a flow chart showing an example of the process 700 which enables the user to search for a particular data object or set of data objects. The process 700 begins with initiating (702) a GUI. For example, the presentation engine 110 may initiate the GUI 200.

Process 700 may receive an input corresponding to a destination data object or set of destination data objects (704). In response to such input, the process 700 finds paths leading from the data object (or set of data objects) currently in focus (in the center of the screen) to the destination data object or set of destination objects entered by the user.

If the user input is ambiguous or if there are multiple possible destination data objects matching the user input (706), the user may first be presented (708) with multiple possible selections of the type of data object s/he is actually interested in. In the example shown in FIG. 4, the presentation engine 110 presents the GUI 400 in response to the user input in the field 306 indicating the production order destination data object. If there is further user input (710), such as selecting one of the graphical elements associated with the paths presented, then the process 700 alters (712) the visual representation or presents additional information.

If the user input identifies a destination data object (706), then the process 700 may receive (714) another input. The process 700 performs (716) data object processing associated with the user input. For example, in response to a user input to list the individual data objects in the materials 202b, the ERP module 114 may present a report specific to the selected data object type.

Figure 8:
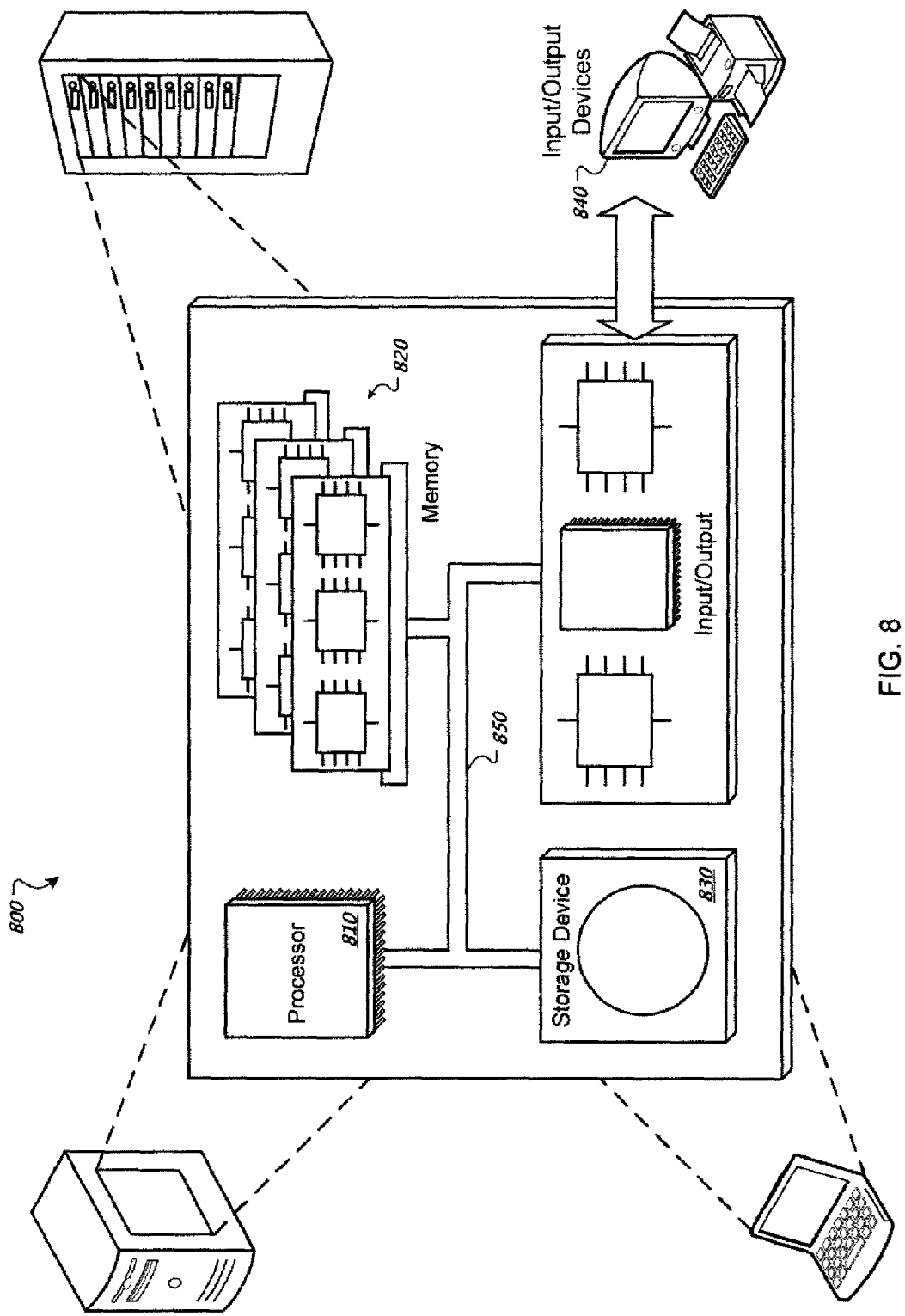
FIG. 8 is a schematic diagram showing an example of one suitable computer system for implementations and processes disclosed therein.

FIG. 8 is a schematic diagram showing an example of one suitable computer system 800 which can be used for the various implementations and operations described herein. For example, the system 800 may include or be included in the ERP system 100.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor 810 is capable of processing instructions stored in the memory 820 or on the storage device 830 to display graphical information for a user interface on the input/output device 840.

The memory 820 stores information within the system 800, and can assume any number of suitable forms and configurations, such as being a computer-readable medium, or volatile or non-volatile memory unit. In another implementation, the memory 820 is a non-volatile memory unit.

The storage device 830 is capable of providing mass storage for the system 800, and can likewise assume any number of suitable forms, such as a computer-readable medium, hard drive or disk drive, tape, optical or other storage media, memory sticks, and the like.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. It will be understood that still further modifications may be made without departing from the spirit and scope of the following claims. Accordingly, other implementations are within the scope of the following claims.

What is claimed is:

1. A method of visually presenting information to a computer user, the method comprising:
    providing a notification at an interface of a computing device that a status of at least one of an initial data object and a semantic relationship between the initial data object and another data object has changed;
    receiving a first user input at the interface, the first user input corresponding to at least one of the initial data object and an initial set of data objects;
    determining, in response to the first user input, semantic relationships among a plurality of data objects, each data object being of a type, wherein the type comprises one or more of a customer, a supplier, a purchase order, and a material, and information about each data object and the semantic relationships among the plurality of data objects being stored in a data object repository;
    filtering the plurality of data objects based on one or more of a particular type of a data object or an instance of the data object to provide filtered data objects;
    grouping the filtered data objects into sets of data objects, the data objects in a set of data objects being of a same type and having a same type of semantic relationship to the at least one of the initial data object and the initial set of data objects;
    presenting, on a display of the interface, a first graphical user interface including multiple path graphical elements presenting respective paths of the semantic relationships between one of the initial data object and the initial set of data objects and a respective one of a destination object and a destination set of data objects, the first graphical user interface allowing the computer user to perform analyses and actions not predefined in existing workflows and to select a first number of data object relationship levels to be presented in the first graphical user interface;
    receiving a second user input at the interface, the second user input indicating a first graphical element, the first graphical element corresponding to a second data object or a second set of data objects provided in a path graphical element; and
    in response to receiving the second user input, presenting, on the display, a second graphical user interface including the first graphical element and at least one semantic relationship between the first graphical element and another graphical element, the second graphical user interface allowing the computer user to perform analyses and actions not predefined in the existing workflows and to select a second number of data object relationship levels to be presented in the second graphical user interface.

2. The method of claim 1, further including presenting at least one semantic relationship between a business object and other data objects, wherein the business object comprises a data object.

3. The method of claim 1, further including, in response to user selection of the first graphical element, presenting a second graphical element corresponding to another set of data objects of a second type, and at least one semantic relationship between presented sets.

4. The method of claim 3, further including presenting information corresponding to the second graphical element in response to user selection of the second graphical element.

5. The method of claim 1, further including moving the first graphical element from a first position to a second position on the display in response to a user input.

6. The method of claim 5, further including presenting the moving as an animation.

7. The method of claim 5, wherein the first graphical element is located on a periphery of the display, and wherein moving the first graphical element includes moving the first graphical element toward a center of the display and displaying graphical elements related to the first graphical element around the first graphical element.

8. The method of claim 1, further including enabling the computer user to search for one of a destination data object or set of destination data objects by presenting multiple paths thereto, the paths including multiple graphical elements and at least one semantic relationship between the graphical elements of the respective paths.

9. The method of claim 8, further including presenting information corresponding to one of the graphical elements in response to user selection thereof.

10. A computer program product tangibly embodied in a non-transitory machine-readable storage device, the computer program product including instructions that, when executed, cause a processor to perform operations comprising:
    providing a notification at an interface of a computing device that a status of at least on of an initial data object and a semantic relationship between the initial data object and another data object has changed;
    receiving a first user input at the interface, the first user input corresponding to at least one of the initial data object and an initial set of data objects;

determining, in response to the first user input, semantic relationships among a plurality of data objects, each data object being of a type, wherein the type comprises one or more of a customer, a supplier, a purchase order, and a material, and information about each data object and the semantic relationships among the plurality of data objects being stored in a data object repository;

filtering the plurality of data objects based on one or more of a particular type of a data object or an instance of the data object to provide filtered data objects;

grouping the filtered data objects into sets of data objects, the data objects in a set of data objects being of a same type and having a same type of semantic relationship to the at least one of the initial data object and the initial set of data objects;

presenting, on a display of the interface, a first graphical user interface including multiple path graphical elements presenting respective paths of the semantic relationships between one of the initial data object and the initial set of data objects and a respective one of a destination object and a destination set of data objects, the first graphical user interface allowing the computer user to perform analyses and actions not predefined in existing workflows and to select a first number of data object relationship levels to be presented in the first graphical user interface;

receiving a second user input at the interface, the second user input indicating a first graphical element, the first graphical element corresponding to a second data object or a second set of data objects provided in a path graphical element;

in response to receiving the second user input, presenting, on the display, a second graphical user interface including the first graphical element and at least one semantic relationship between the first graphical element and another graphical element, the second graphical user interface allowing the computer user to perform analyses and actions not predefined in the existing workflows and to select a second number of data object relationship levels to be presented in the second graphical user interface.

11. The computer program product of claim 10, wherein the operations further comprise determining subsets of the sets of data objects in response to a user input and determining corresponding subsets of the semantic relationships.

12. The computer program product of claim 10, wherein determining semantic relationships between the plurality of data objects includes determining, in response to the user input, multiple sets of data objects associated with at least one of the initial data object and the set of initial data objects, and at least one corresponding path of semantic relationships between the sets of data objects.

13. An information system, comprising:
a computing device having an interface for providing a notification that a status of at least one of an initial data object and a semantic relationship between the initial data object and another data object has changed and receiving a first user input, the first user input corresponding to at least one of an initial data object and an initial set of data objects;

a processor that is operable to:
determine, in response to the first user input, semantic relationships among a plurality of data objects, each data object being of a type, wherein the type comprises one or more of a customer, a supplier, a purchase order, and a material, and information about each data object and the semantic relationships among the plurality of data objects being stored in a data object repository, filter the plurality of data objects based on one or more of a particular type of a data object or an instance of the data object to provide filtered data objects;

group the filtered data objects into sets of data objects, the data objects in a set of data objects being of a same type and having a same type of semantic relationship to the at least one of the initial data object and the initial set of data objects, and receive a second user input indicating a first graphical element, the first graphical element corresponding to a second data object or a second set of data objects provided in a path graphical element; and a display of the interface for:
presenting a first graphical user interface including multiple path graphical elements presenting respective paths of semantic relationships between one of the initial data object and the initial set of data objects and a respective one of a destination object and a destination set of data objects, the first graphical user interface allowing the computer user to perform analyses and actions not predefined in existing workflows and to select a first number of data object relationship levels to be presented in the first graphical user interface; and presenting, in response to receiving the second user input, a second graphical user interface including the first graphical element and at least one semantic relationship between the first graphical element and another graphical element, the second graphical user interface allowing the computer user to perform analyses and actions not predefined in the existing workflows and to select a second number of data object relationship levels to be presented in the second graphical user interface.

14. The system of claim 13, wherein the processor is further operable to determine at least one ad hoc path between a data object and at least one of the sets of data objects as a function of the user input.

15. The system of claim 13, wherein the display presents graphical elements corresponding to the set of data objects semantically related to the initial data object.

16. The system of claim 13, wherein the initial data object comprises a business object, and wherein the information system comprises at least one system selected from the group consisting of an enterprise resource planning system, a customer relationship management system, and a supply chain management system.

17. The method of claim 1, wherein each path graphical element includes a plurality of graphical elements, an initial graphical element of each path graphical element being the same across the path graphical elements.

18. The method of claim 1, wherein the first user input comprises query text that is input into a search field.

19. The computer program product of claim 10, wherein each path graphical element includes a plurality of graphical elements, an initial graphical element of each path graphical element being the same across the path graphical elements.

20. The computer program product of claim 10, wherein the first user input comprises query text that is input into a search field.

* * * * *